(12) United States Patent
Piskunov et al.

(10) Patent No.: US 12,541,918 B2
(45) Date of Patent: Feb. 3, 2026

(54) SYSTEM AND METHOD FOR SURFACE PROPERTIES RECONSTRUCTION AND POSITIONING OF DIGITIZED 3D OBJECTS

(71) Applicant: Samsung Electronics Co., Ltd., Suwon-si (KR)

(72) Inventors: Dmitriy Evgenyevich Piskunov, Moscow (RU); Anastasiia Sergeevna Suvorina, Moscow (RU); Aleksei Mikhailovich Gruzdev, Moscow (RU); Alexey Aleksandrovich Osipov, Moscow (RU); Daria Andreevna Fedorova, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 18/494,202

(22) Filed: Oct. 25, 2023

(65) Prior Publication Data

US 2024/0144591 A1    May 2, 2024

(30) Foreign Application Priority Data

Oct. 28, 2022 (RU) .................. 2022128045

(51) Int. Cl.
*G06T 7/70* (2017.01)
*G06T 15/00* (2011.01)
*G06T 17/00* (2006.01)

(52) U.S. Cl.
CPC ............... *G06T 17/00* (2013.01); *G06T 7/70* (2017.01); *G06T 15/00* (2013.01); *G06T 2210/61* (2013.01)

(58) Field of Classification Search
None
See application file for complete search history.

(56) References Cited

U.S. PATENT DOCUMENTS

| 5,703,961 | A | 12/1997 | Rogina et al. |
| 5,712,732 | A | 1/1998 | Street |
| 5,797,050 | A | 8/1998 | Smith |

(Continued)

FOREIGN PATENT DOCUMENTS

| CN | 101742349 A | 6/2010 |
| CN | 101742349 B | 7/2011 |

(Continued)

OTHER PUBLICATIONS

Modeling the Interaction of Light Between Diffuse Surfaces, Jul. 1984.

(Continued)

*Primary Examiner* — Joni Hsu
(74) *Attorney, Agent, or Firm* — Jefferson IP Law, LLP

(57) ABSTRACT

A method for generating a virtual scene comprising one or more 3D objects is provided. The method includes creating a 3D model of a real world 3D scene, capturing an image of the real world 3D scene by a physical camera to obtain a captured image, creating a digital camera model of the physical camera, rendering a virtual 3D scene comprising virtual 3D objects based on the digital camera model using physical-based rendering software to obtain a virtual image, and minimizing dissimilarity norm between the captured image and the virtual image to optimize positions and surface parameters of the virtual 3D objects in the virtual 3D scene.

19 Claims, 8 Drawing Sheets

(56) References Cited

U.S. PATENT DOCUMENTS

| | | | |
|---|---|---|---|
| 6,028,606 A | 2/2000 | Kolb et al. | |
| 6,522,312 B2 | 2/2003 | Ohshima et al. | |
| 7,768,527 B2 | 8/2010 | Zhang et al. | |
| 8,009,081 B2 | 8/2011 | Hong et al. | |
| 8,213,707 B2 | 7/2012 | Li et al. | |
| 8,395,642 B2 | 3/2013 | Yea et al. | |
| 8,933,965 B2 | 1/2015 | Tomite et al. | |
| 8,953,064 B1 | 2/2015 | Ng et al. | |
| 9,195,121 B2 | 11/2015 | Sajadi et al. | |
| 9,225,942 B2 | 12/2015 | Zhang et al. | |
| 9,479,685 B2 | 10/2016 | Ng et al. | |
| 9,729,803 B2 | 8/2017 | Holliday | |
| 9,834,143 B2 | 12/2017 | Zhang et al. | |
| 9,858,639 B2 | 1/2018 | Zhang et al. | |
| 9,898,662 B2 | 2/2018 | Tsuda et al. | |
| 10,119,809 B2 | 11/2018 | Narayanswamy et al. | |
| 10,198,865 B2 | 2/2019 | Kezele et al. | |
| 10,360,718 B2 | 7/2019 | Chernov et al. | |
| 10,375,382 B2 | 8/2019 | Gorilovsky et al. | |
| 10,460,445 B2 | 10/2019 | Evertt et al. | |
| 10,531,793 B2 | 1/2020 | Swital et al. | |
| 10,649,210 B2 | 5/2020 | Cobb et al. | |
| 10,665,019 B2 | 5/2020 | Hildreth et al. | |
| 10,951,882 B2 | 3/2021 | Oonishi | |
| 10,983,355 B2 | 4/2021 | Khan | |
| 11,061,208 B2 | 7/2021 | Trubko et al. | |
| 11,115,633 B2 | 9/2021 | Grundhofer | |
| 11,127,225 B1* | 9/2021 | Kowalski | G06T 19/006 |
| 11,241,960 B2 | 2/2022 | Watanabe | |
| 11,250,617 B1* | 2/2022 | Sempe | H04L 65/611 |
| 11,516,412 B2 | 11/2022 | Zhang et al. | |
| 11,606,548 B2 | 3/2023 | Oonishi | |
| 11,768,377 B2 | 9/2023 | Edwin et al. | |
| 2001/0043737 A1 | 11/2001 | Rogina et al. | |
| 2002/0084974 A1 | 7/2002 | Ohshima et al. | |
| 2006/0285741 A1* | 12/2006 | Subbarao | H04N 13/207 348/E13.005 |
| 2008/0259419 A1* | 10/2008 | Wilson | G03H 1/0808 359/9 |
| 2009/0102841 A1 | 4/2009 | Clavadetscher | |
| 2010/0097262 A1 | 4/2010 | Hong et al. | |
| 2010/0238160 A1 | 9/2010 | Yea et al. | |
| 2012/0098937 A1 | 4/2012 | Sajadi et al. | |
| 2014/0104424 A1 | 4/2014 | Zhang et al. | |
| 2014/0347469 A1 | 11/2014 | Zhang et al. | |
| 2014/0362227 A1 | 12/2014 | Holliday | |
| 2015/0029388 A1 | 1/2015 | Ng et al. | |
| 2015/0156402 A1 | 6/2015 | Ng et al. | |
| 2015/0243035 A1* | 8/2015 | Narasimha | G06T 7/344 382/154 |
| 2015/0262411 A1 | 9/2015 | Gordon et al. | |
| 2015/0325046 A1 | 11/2015 | Meier | |
| 2016/0012643 A1 | 1/2016 | Kezele et al. | |
| 2016/0098815 A1 | 4/2016 | Zhang et al. | |
| 2016/0241791 A1 | 8/2016 | Narayanswamy et al. | |
| 2016/0307372 A1* | 10/2016 | Pitts | H04N 23/957 |
| 2017/0195527 A1 | 7/2017 | Reynolds et al. | |
| 2018/0152694 A1 | 5/2018 | Oonishi | |
| 2018/0220048 A1 | 8/2018 | Tamir et al. | |
| 2018/0308281 A1 | 10/2018 | Okoyama | |
| 2018/0372648 A1* | 12/2018 | Wissmann | G01N 21/88 |
| 2018/0376116 A1 | 12/2018 | Grundhofer | |
| 2019/0180082 A1 | 6/2019 | Moravec et al. | |
| 2020/0018968 A1 | 1/2020 | Edwin et al. | |
| 2020/0029128 A1* | 1/2020 | Erskine | H04N 21/4318 |
| 2020/0167568 A1 | 5/2020 | Hu et al. | |
| 2020/0226729 A1 | 7/2020 | Zhang et al. | |
| 2020/0358996 A1 | 11/2020 | Cheng | |
| 2020/0368616 A1 | 11/2020 | Delamont | |
| 2020/0371356 A1 | 11/2020 | Khan | |
| 2021/0168351 A1 | 6/2021 | Donishi | |
| 2021/0256729 A1 | 8/2021 | Colmenares et al. | |
| 2021/0311311 A1 | 10/2021 | Khan | |
| 2022/0150386 A1 | 5/2022 | da Costa Marques Arrabal et al. | |
| 2023/0101876 A1* | 3/2023 | Kawamata | G06T 15/06 345/426 |
| 2023/0119330 A1* | 4/2023 | Macleod | G06V 40/168 345/473 |
| 2024/0054720 A1* | 2/2024 | Fidler | G06T 15/506 |
| 2024/0428437 A1* | 12/2024 | Gupta | G06T 17/05 |

FOREIGN PATENT DOCUMENTS

| | | |
|---|---|---|
| CN | 102496005 A | 6/2012 |
| CN | 101794349 B | 8/2012 |
| CN | 102929091 A | 2/2013 |
| CN | 103028252 A | 4/2013 |
| CN | 103302668 A | 9/2013 |
| CN | 103310448 A | 9/2013 |
| CN | 103578135 A | 2/2014 |
| CN | 103778649 A | 5/2014 |
| CN | 103873773 A | 6/2014 |
| CN | 203630822 U | 6/2014 |
| CN | 104079839 A | 10/2014 |
| CN | 104243959 A | 12/2014 |
| CN | 103873773 B | 4/2015 |
| CN | 104536579 A | 4/2015 |
| CN | 105320271 A | 2/2016 |
| CN | 103302668 B | 3/2016 |
| CN | 104243959 B | 4/2016 |
| CN | 106168853 A | 11/2016 |
| CN | 103578135 B | 1/2017 |
| CN | 106462895 A | 2/2017 |
| CN | 106504055 A | 3/2017 |
| CN | 104185010 A | 6/2017 |
| CN | 106846410 A | 6/2017 |
| CN | 106954060 A | 7/2017 |
| CN | 107003600 A | 8/2017 |
| CN | 107037584 A | 8/2017 |
| CN | 107067856 A | 8/2017 |
| CN | 107111113 A | 8/2017 |
| CN | 206497255 U | 9/2017 |
| CN | 107610078 A | 1/2018 |
| CN | 107636514 A | 1/2018 |
| CN | 105091906 B | 3/2018 |
| CN | 104536579 B | 7/2018 |
| CN | 103778649 B | 8/2018 |
| CN | 108427199 A | 8/2018 |
| CN | 105320271 B | 9/2018 |
| CN | 108540731 A | 9/2018 |
| CN | 108540790 A | 9/2018 |
| CN | 108551557 A | 9/2018 |
| CN | 108780357 A | 11/2018 |
| CN | 108919950 A | 11/2018 |
| CN | 109003305 A | 12/2018 |
| CN | 109064552 A | 12/2018 |
| CN | 109089025 A | 12/2018 |
| CN | 109242958 A | 1/2019 |
| CN | 106954060 B | 3/2019 |
| CN | 109064552 B | 3/2019 |
| CN | 109712247 A | 5/2019 |
| CN | 109727314 A | 5/2019 |
| CN | 109740425 A | 5/2019 |
| CN | 109949228 A | 6/2019 |
| CN | 109961520 A | 7/2019 |
| CN | 110070139 A | 7/2019 |
| CN | 110210449 A | 9/2019 |
| CN | 110225328 A | 9/2019 |
| CN | 110569849 A | 12/2019 |
| CN | 110573369 A | 12/2019 |
| CN | 110076277 B | 2/2020 |
| CN | 106846410 B | 6/2020 |
| CN | 107037584 B | 6/2020 |
| CN | 111586394 A | 8/2020 |
| CN | 111680177 A | 9/2020 |
| CN | 112215949 A | 1/2021 |
| CN | 112215966 A | 1/2021 |
| CN | 112242009 A | 1/2021 |
| CN | 112416123 A | 2/2021 |
| CN | 112423384 A | 2/2021 |
| CN | 112424671 A | 2/2021 |
| CN | 112507799 A | 3/2021 |
| CN | 112767461 A | 5/2021 |

(56) References Cited

FOREIGN PATENT DOCUMENTS

| CN | 113129451 A | 7/2021 |
|---|---|---|
| CN | 113260430 A | 8/2021 |
| CN | 113306308 A | 8/2021 |
| CN | 110070139 B | 10/2021 |
| CN | 113570536 A | 10/2021 |
| CN | 111587393 B | 11/2021 |
| CN | 113656918 A | 11/2021 |
| CN | 113676711 A | 11/2021 |
| CN | 113692734 A | 11/2021 |
| CN | 110210449 B | 4/2022 |
| CN | 110569849 B | 4/2022 |
| CN | 114306956 A | 4/2022 |
| CN | 114330502 A | 4/2022 |
| CN | 114445242 A | 5/2022 |
| EP | 0686865 A1 | 12/1995 |
| EP | 00899690 A2 | 3/1999 |
| EP | 00687366 B1 | 1/2000 |
| EP | 02230855 A2 | 9/2010 |
| EP | 02378488 A2 | 10/2011 |
| EP | 02966863 A1 | 1/2016 |
| EP | 03680853 A1 | 7/2020 |
| RU | 2 606 875 C2 | 1/2017 |
| RU | 2 642 167 C2 | 1/2018 |
| WO | 94020875 A2 | 9/1994 |
| WO | 96021197 A1 | 7/1996 |
| WO | 10129363 A2 | 11/2010 |
| WO | 18089039 A1 | 5/2018 |
| WO | 18089041 A1 | 5/2018 |
| WO | 18224847 A2 | 12/2018 |
| WO | 20014700 A1 | 1/2020 |
| WO | 21163406 A1 | 8/2021 |
| WO | 21173637 A1 | 9/2021 |
| WO | 21257172 A1 | 12/2021 |

OTHER PUBLICATIONS

Physically Based Rendering. From Theory to Implementation, third edition, Amsterdam: Elsevier, Sep. 2016.
Handbook of Optics, Michael Bass, Sep. 1994.
Luis Romero, Nuno Correia, HyperReal: A Hypermedia Model for Mixed Reality, Aug. 2003.
Russian Search Report dated May 15, 2023, issued in Russian Patent Application No. 2022128045.
Russian Office Action dated May 15, 2023, issued in Russian Patent Application No. 2022128045.
Russian Decision on Grant dated Jul. 6, 2023, issued in Russian Patent Application No. 2022128045.

* cited by examiner

SYSTEM AND METHOD FOR SURFACE PROPERTIES RECONSTRUCTION AND POSITIONING OF DIGITIZED 3D OBJECTS

CROSS-REFERENCE TO RELATED APPLICATION(S)

This application is based on and claims priority under 35 U.S.C. § 119(a) of a Russian patent application number 2022128045, filed on Oct. 28, 2022, in the Russian Intellectual Patent Office, the disclosure of which is incorporated by reference herein in its entirety.

BACKGROUND

1. Field

The disclosure relates to three-dimensional (3D) imaging. More particularly, the disclosure relates to metaverse client terminals, augmented reality or virtual reality (AR/VR) systems, 3D scanners, and input devices, etc., for improving accuracy of 3D objects digitizing by means of more accurate reconstruction of 3D objects surface and positioning of 3D objects in an imaged 3D scene.

2. Description of Related Art

Various 3D imaging technologies are presently developed, which are particularly suited for 3D object and scene model construction for AR/VR systems and metaverse. Besides, 3D imaging techniques are also used in human body measurements, advanced product inspection techniques. In all these technical fields, automatic positioning of 3D objects within a 3D scene, as well as reconstruction of surface textures with high accuracy is of critical importance. Most currently used 3D imaging devices employ mechanical scanning or structured lighting without object positioning and texture reconstruction.

To make production of 3D imaging camera modules, AR/VR headsets, smart devices equipped with optics cheaper, as well as to avoid unnecessary prototyping steps, and to decrease development time, it is necessary to have reliable 3D scene simulation software and hardware. A real world 3D scene captured by a camera or viewed through an AR/VR headset are usually simulated by rendering. Quality of said simulation is determined by the accuracy of rendering software. To verify the rendering software, it is necessary to have a digital "twin" of the real world scene and camera module. To match simulation conditions with those of the real world 3D scene arrangement, it is necessary to isolate the real world 3D scene from external influences.

Thus, such 3D imaging technologies require creating a digital twin of a real world 3D scene to be imaged, a physical-based camera model for image simulation, photorealistic rendering, model construction in the case of an AR/VR system or metaverse, as well as calibration and testing of optical devices, i.e., a camera, a projector, a head-mounted device (HMD).

Reconstruction of surface properties of a scanned real world 3D object is usually performed in the following manner. A 3D scanner involves a color camera to capture such properties of a real world 3D object as color, texture, light scattering, reflectivity. However, in prior art 3D scanning techniques, accurate calibration of surface properties is not possible since a spectral range of the camera is restricted by a Bayer filter or integrated backlight source, which are actually used. Resolution is restricted by a distance between the scanner and the object being scanned, and is reduced due to motion blur (since the scanner moves while scanning).

One of the problems in the field of 3D imaging consists in arranging virtual objects with high accuracy. Besides, another problem consists in measuring positional relationship (relative position) of objects and applying it to a virtual scene.

Reference U.S. Pat. No. 10,460,445 B2 (Microsoft Technology, published 29 Oct. 2019) describes a method for creating a digital representation ("digitization") of an object in an image, in which, to digitize an object, a camera captures images of different sides of the object with color and depth data. At least two sides of the object are identified from these images, and constructions are created of said sides of the object from said images. Points of the constructions to connect to one another are determined and used to align the constructions. The constructions are then merged to generate a rendition of the object. Various techniques are applied to extrapolate edges, remove seams, extend color intelligently, filter noise, apply skeletal structure to the object, and further optimize the digitization. The rendition of the object can be provided for display as a digital representation of the object and potentially used in different applications (e.g., games, Web applications, etc.). Among drawbacks of this solution is that high quality texture capturing is difficult due to fixed camera positions, limited spectral range, and this known method does not enable positioning of digitized objects.

Reference U.S. Pat. No. 8,213,707 B2 (City University of Hong Kong, published 3 Jul. 2012) describes a system and method for measuring and surface reconstruction of a 3D image of an object. The system comprises a projector arranged to project a light pattern onto a surface of an object to be imaged, and a processing stage arranged to analyze distortion or distortions produced in the light pattern by the surface. The processing stage is arranged to convert said distortion or distortions produced in the light pattern by the surface by means of e.g. a triangulation process into a distance representation representative of the shape of the surface. The processing stage is also arranged to electronically reconstruct the surface shape of the object. This solution has a drawback, which consists in a need for a color-coded array light pattern projection for 3D imaging of an object with its surface.

Reference "Modeling the Interaction of Light Between Diffuse Surface", Cornell University/paper in Computer Graphics (SIGGRAPH '84 Proceedings), Vol. 18, No. 3, July 1984, pp. 213-222, describes a 3D imaging method in which, to verify theoretical results by comparison with a real environment, a physical model of a simple environment was constructed and photographed. Fiber board panels, painted with flat latex paints to minimize specular reflections were used to construct a test cube. The cube was constructed of one red, one blue, and three white panels. One side was left open for viewing and photographic purposes. A Cornell box is a commonly used 3D test model at determining the accuracy of rendering software by comparing the rendering scene with an actual photograph. Among the drawbacks of this solution, one may mention that it is implemented in a predetermined environment, it is not isolated from external influences, and does not involve any camera model.

Reference U.S. Pat. No. 8,933,965 B2 (Canon Inc., published 13 Jan. 2015) describes a method of presenting a combined image in which an image of a real world space is combined with a virtual image of a virtual object. The method includes receiving image data for a plurality of captured images, which includes images relating to different respective parts of the real world space, generating modeling image data, representing an image covering at least a predetermined portion of the real world space, based on the received image data for the plurality of captured images, estimating light source information relating to the real world space based on the modeling image data, generating virtual image data, representing the virtual image, including managing light source information relating to the virtual object based on the estimated light source information relating to the real world space, and updating the modeling image data following receipt of image data for a new captured image relating to such part of the real world space, and updating the estimated light source information relating to the real world space based on the updated modeling image data, and updating the light source information relating to the virtual object based on the updated light source information relating to the real world space, and regenerating the virtual image data. However, this reference does not disclose any method for combining real and virtual images, method of rendering software verification or camera testing.

Reference U.S. Pat. No. 10,119,809 B2 (Intel Corp., published 6 Nov. 2018) describes a camera simulation method in multi-camera systems, wherein computer graphics, single camera simulation and a multi-camera image signal processor (ISP) are combined to simulate and optimize a multi-camera system. Scene modeling is performed using synthetic computer generated scenes. Computer graphics images are generated taking into account camera-intrinsic and camera-extrinsic parameters. Processing includes imparting lens aberration and diffraction effects to the virtual scene in a sensor plane so as to produce a raw image via the computer graphics. This known solution is used for rendering virtual objects, and not for digitization of real world objects.

Reference U.S. Pat. No. 6,028,606 A (Leland Stanford Junior University, published 22 Feb. 2000) discloses a technique for image rendering in computer graphics, in particular using camera-based models to synthesize a two dimensional image from data representing a radiant three-dimensional scene. In particular, described is a method for modeling a physical camera in computer graphics systems, in which, given the parameters from manufacturer's specifications of physical camera lenses, such as dimensions and indices of refraction of the lenses, stops, and shutter characteristics, location of image sensor relative to the lens system, and orientation of the camera within the scene, physical principles of image formation are accurately and efficiently mimicked so as to produce an image which approximates an image produced by the physical camera. However, this reference does not disclose any camera calibration method, and this solution is not suitable for generating a dataset of images.

Reference US 20090102841 A1 (Sony Electronics Inc., published 23 Apr. 2009) describes a virtual camera and lens system in a three dimensional computer graphic modeling environment, which system is configured using a nominal focal length as well as a focus distance. A true focal length is calculated. An optical axis object that represents the optical axis of the virtual camera and lens system is created in the three dimensional computer graphic modeling environment. An object is attached to the optical axis at a location that visualizes the configuration of the virtual camera and lens system as determined from the true focal length. The focal length of the virtual camera and lens system is set to the calculated true focal length. The focus distance and f-stop may be determined basing on near and far focus points. However, this solution makes use of an ideal model of camera and not a physically correct (physical based) model. Besides, only a focal lens is used for image generation in this reference.

Reference U.S. Pat. No. 7,768,527 B2 (Beihang University, published 3 Aug. 2010) describes a hardware-in-the-loop simulation system which is intended for verifying computer vision, the system comprising a virtual reality imaging unit that generates a virtual scene, a projector that projects the virtual scene, a camera that captures an image of the virtual scene, wherein the virtual reality imaging unit comprises a first computer, and wherein said projector is connected to the virtual reality imaging unit. The camera sends image data gathered while shooting the projected scene images to a second computer by a frame grabber board, and the second computer is configured to control the pan-tilt to select a proper direction for the camera to capture images of the virtual scene projected onto the screen. Among drawbacks of this solution, one may name the use of flat test objects for camera calibration, and not 3D objects.

Reference US 20180220048 A1 (Tetavi Ltd., published 2 Aug. 2018) describes methods for foreground/background separation and for studio production of a free viewpoint three-dimensional video (FVV). The described method includes projecting, onto objects in a filming area within a studio, a predefined light pattern including a large set of features, generating, based on signals reflected off the objects and captured by a plurality of depth cameras deployed in proximity to the filming area, a local point cloud for each depth camera, separating, based on the local point clouds, a background and a foreground of the filming area, creating, based on the local point clouds, a unified point cloud, meshing points in the unified point cloud to generate a 3D model of the objects, texturing the 3D model based on the separation as well as on images captured by the depth cameras, and rendering the textured 3D model as a FVV including a series of video frames with respect to at least one viewpoint. However, the described method is only used for registration of a 3D object using a plurality of cameras with a point cloud projected onto the object.

Reference U.S. Pat. No. 10,119,809 B2 as described above is considered to be the closest prior art to the disclosure.

The above information is presented as background information only to assist with an understanding of the disclosure. No determination has been made, and no assertion is made, as to whether any of the above might be applicable as prior art with regard to the disclosure.

SUMMARY

This section which discloses various aspects of the disclosure is intended for providing a brief overview of the claimed subject matters and their embodiments. Detailed characteristics of technical means and methods that implement the combinations of features of the disclosures are provided hereinbelow. Neither this summary of disclosure nor the detailed description provided below together with accompanying drawings should be regarded as defining the scope of legal protection of the disclosure. The scope of legal protection of the disclosure is only defined by the appended set of claims.

Technical problems to be solved by the disclosure consist in the need for generating a virtual scene based on real world 3D objects taking into account surface texture, shape and positions of said 3D objects.

Aspects of the disclosure are to address at least the above-mentioned problems and/or disadvantages and to provide at least the advantages described below. Accordingly, an aspect of the disclosure is to provide a technique for generating a virtual scene comprising one or more 3D objects based on a real world 3D scene.

Additional aspects will be set forth in part in the description which follows and, in part, will be apparent from the description, or may be learned by practice of the presented embodiments.

Technical results achieved by implementing the disclosure consist in accurate rendering of surface texture, shapes and positions of real world 3D objects in a virtual 3D scene.

In accordance with an aspect of the disclosure, a method for generating a virtual scene comprising one or more 3D objects is provided. The method may include creating a virtual 3D scene comprising virtual 3D objects, wherein the virtual 3D scene is a 3D model of a real world 3D scene.

In an embodiment, the method may further include capturing an image of the real world 3D scene by a physical camera to obtain a captured image.

In an embodiment, the method may further include creating a digital camera model of the physical camera.

In an embodiment, the method may further include rendering the virtual 3D scene based on the digital camera model using physical-based rendering software to obtain a virtual image.

In an embodiment, the method may further include minimizing a dissimilarity norm between the captured image and the virtual image to optimize positions and surface parameters of the virtual 3D objects in the virtual 3D scene.

It should be noted that, in scientific and technical literature, the term "physical based rendering" implies various methods of virtual scene 3D objects imaging, which are characterized by a high degree of photorealism (see Matt Pharr, Wenzel Jakob, Greg Humphreys "Physically Based Rendering. From Theory to Implementation", third edition, Amsterdam: Elsevier, 2016). In the disclosure, photorealism is achieved by using a detailed camera model, which accounts for wavelike properties of light, parameters of optical system, image sensor and processing algorithm, and is evaluated by a value of dissimilarity norm between the captured image and the virtual image.

Minimizing the dissimilarity norm between the captured image and the virtual image may comprise applying an algorithm of surface properties reconstruction to optimize the surface parameters of the virtual 3D objects, and/or applying an algorithm of virtual objects positioning to optimize the positions and shape of the virtual 3D objects. The physical-based rendering software may use the parameters of the physical camera to create the digital camera model, as well as light wave propagation modeling in rendering the virtual 3D scene. The digital camera model may comprise a set of filters, which comprises a spectral filter configured to expand the color range in the digital camera model. An "on-chip lens" (OCL) type image sensor may be used in the digital camera model, wherein two, four or more of identical adjacent pixels have a common lens.

At the step of rendering the virtual 3D scene, the digital camera model may create an image of at least one virtual image object created at the step of creating the virtual 3D scene comprising virtual 3D objects. The digital camera model may be based on a pinhole camera model (a so-called camera with a pinhole aperture), on an ideal lens model, on an optical system model which is free from aberrations except distortion, on an optical system model with chromatic aberrations, or on a detailed optical system model which accounts for aberrations and diffraction. The digital camera model may further comprise a polarization filter model.

In accordance with another aspect of the disclosure, a system for generating a virtual scene comprising one or more 3D objects is provided. The system may include a physical camera configured to capture an image of a real world 3D scene to obtain a captured image.

In an embodiment, the system may further include a 3D scene digitizer configured to create a virtual 3D scene comprising 3D objects, wherein the virtual 3D scene is a 3D model of the real world 3D scene.

In an embodiment, the system may further include a renderer including at least one processor configured to provide a digital camera model of the physical camera, and to render the virtual 3D scene based on the digital camera model to obtain a virtual image.

In an embodiment, the system may further include an optimizer including at least one processor configured to minimize a dissimilarity norm between the captured image and the virtual image to optimize the positions and surface parameters of the virtual 3D objects in the virtual 3D scene. The 3D scene digitizer may comprise a 3D scanner, a light-field or depth camera, or a 3D printer with software for 3D modeling.

In accordance with another aspect of the disclosure, a computer readable medium having stored thereon a computer program for performing the method of the above-mentioned first aspect when run on a computer or a processor is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
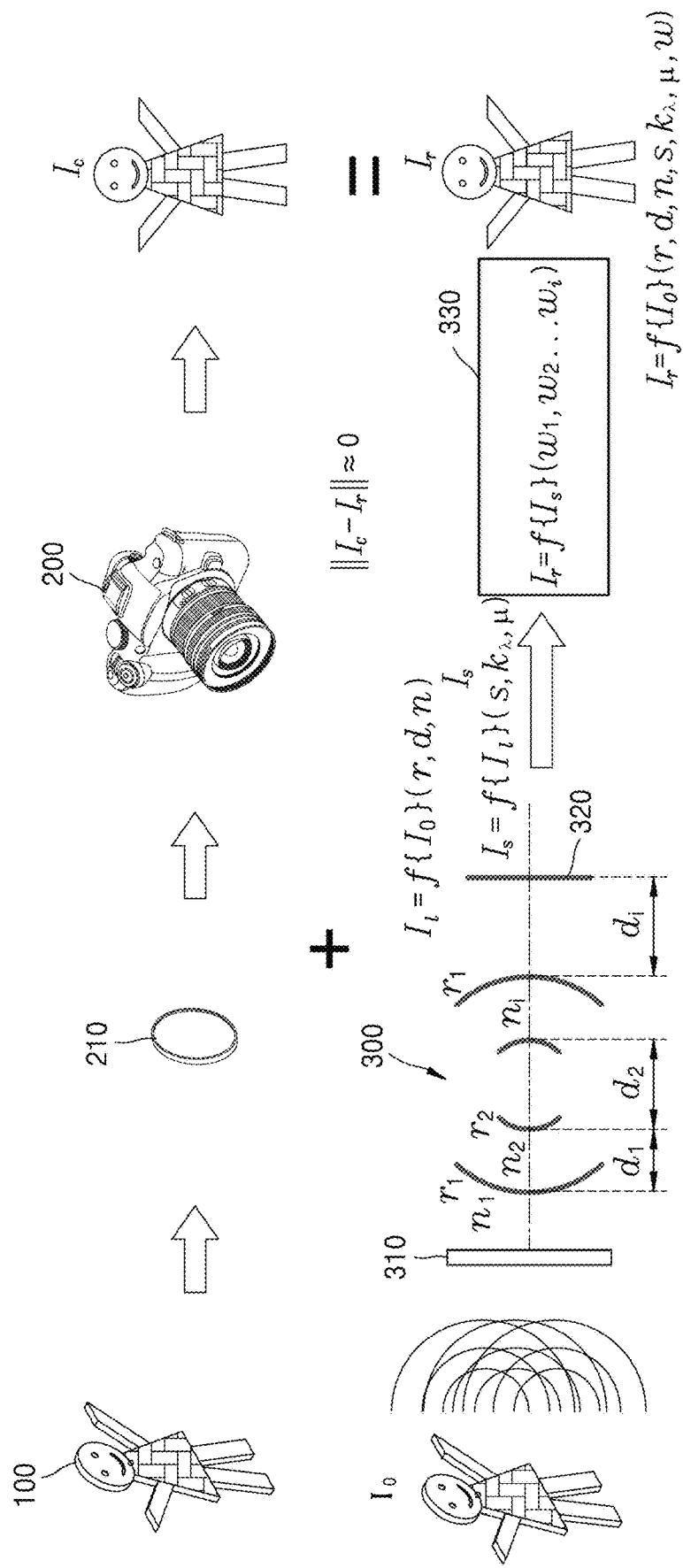
FIG. 1 schematically illustrates a technique for generating a virtual scene comprising one or more 3D objects according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The proposed disclosure relates to a technique for reconstructing surface properties and shapes and positions of virtual 3D objects in a virtual 3D scene based upon a real world 3D scene which includes real world 3D objects. The inventive technique may be applied in various technical fields to obtain a photorealistic virtual 3D scene where virtual 3D objects accurately reproduce the shape and texture of their real world 3D counterparts and are accurately positioned within the virtual 3D scene.

The inventive technique involves at least one real world camera (hereinafter referred to as a physical camera), a 3D scanner or other means of creating a 3D model of a real world 3D scene, which are well known by ones skilled in the art. It may be practically implemented in such products as a camera lens, an AR/VR optical system, rendering software etc.

The proposed disclosure is based upon creating a "digital twin" of a real world 3D scene using a physical-based camera model (on the basis of physics) (which is hereinafter also referred to as a "digital twin" of the physical camera) which employs the parameters of the physical camera to create a virtual 3D scene using physical-based rendering software, thus "simulating" the real world 3D scene in the virtual 3D scene. This enables photorealistic rendering of the virtual 3D scene and constructing 3D models which correspond to the real world 3D objects from the initial real world 3D scene with high accuracy of their textures, shapes and positions for use, in particular, in AR/VR systems and/or metaverse techniques, as well as for calibration and testing of optical devices, such as cameras, projectors, head-mounted displays (HMDs) etc.

The inventive technique attends to various challenges in producing photorealistic 3D models, such as automatic positioning of 3D objects and reconstruction of surface texture with high accuracy, in particular for the purposes of model construction for AR/VR and metaverse, human body measurements, advanced product inspection. The inventive technique also attends to various challenges in the field of production of visual devices, such as making the production of camera modules, AR/VR headsets, smart devices equipped with optics cheaper, avoiding unnecessary prototyping steps, shortening development time, by providing a reliable means for 3D scene simulation and camera simulation.

Generally, a real world 3D scene captured by a camera or viewed through an AR/VR headset is simulated by rendering. Quality of simulation is determined by the accuracy of rendering software. To verify the rendering software, it is necessary to have a virtual model (a "digital twin") of the real world scene and the camera module. To match the simulation conditions with those, in which the real world 3D scene is arranged, it is necessary to isolate the real world 3D scene from any external influences.

When a 3D model of the real world 3D scene is initially created (initial 3D model $I_0$), this 3D model is generally inaccurate in terms of mutual arrangement (positional relationship) and shape and texture of the 3D objects which exist in the real world 3D scene.

In the disclosure, a real world 3D scene is imaged in two ways. On one hand, a 3D model of the real world 3D scene is created using a 3D scanner, a light-field or depth camera, or software for 3D modeling, or any other method which ones skilled in the art may appreciate. On the other hand, one or more images (hereinafter referred to as captured images $I_c$) of the real world 3D scene are captured using a "physical" (i.e. real world) camera.

Alongside with that, based upon the parameters of the physical camera, a digital camera model of the physical camera (also referred to herein as digital twin of the physical camera) is created by means of respective software.

Then, the digital twin of the camera (i.e. digital camera model) is used by a physical-based rendering software to render a virtual 3D scene comprising virtual 3D objects to obtain a virtual (rendered) image $I_r$. As an example of the physical-based rendering software, one may mention e.g. commercial software which may perform functions in accordance with the disclosure. Typically, software accounts for a physical camera at the "artistic" effects level (such as blur, distortion, shadows etc.), which only approximates the effects of a real camera (such as aberrations, diffraction, vignetting). By way of an example, such software may be e.g. 3ds Max, Maya, Arnold, Blender 3D. However, in the disclosure the same effects may be advantageously achieved by ray tracing and/or estimation of wave propagation through the optical system of a physical camera and application of the same image processing algorithms as in the real physical camera.

Positions and surface parameters of the virtual 3D objects within the virtual 3D scene are optimized by minimizing dissimilarity norm between the captured image and the virtual image:

$$\|I_c - I_r\| \xrightarrow{min} 0$$

It should be noted that the concept of dissimilarity is a mathematical term which, in the context of the disclosure, substantially means a pixelwise difference between two images, in particular the difference between image $I_c$ captured by a camera and virtual image $I_r$ obtained by rendering. In an embodiment of the disclosure, dissimilarity norm $\| . .$ .‖ may be a mean square error between the captured image and the virtual image. In such case, the norm ‖ . . . ‖ is an L2 (Euclidean) norm. This parameter is a dimensionless parameter, while, the smaller its value, the better match between the images is achieved. Image $I_c$ captured by a camera and virtual image $I_r$ are number matrices which comprise information on intensity of each pixel for each color channel. Image $I_c$ is directly generated by the physical camera. Image $I_r$ is defined as a result of ray tracing calculation or light wave propagation modeling via the digital camera model. Thus, image $I_r$ is an implicit function of digital camera model parameters. By varying the digital camera model parameters, surface property parameters or shape parameters and positions of virtual objects using known optimization algorithms (e.g. gradient descent method, least square method), dissimilarity norm minimization is achieved. Dissimilarity is deemed to be minimized when it no longer significantly decreases in the process of optimization. By way of a non-limiting example, this condition may be considered to be met if, at a next optimization step, dissimilarity norm does not change by more than 1% as compared to the previous optimization step.

In particular, minimization of dissimilarity norm between the captured image and the virtual (rendered) image involves two algorithms—an algorithm of surface properties reconstruction and an algorithm of virtual objects positioning. The algorithm of surface properties reconstruction optimizes surface properties by means of said minimization of dissimilarity norm between the captured image and the virtual image. The algorithm of virtual objects positioning optimizes the positions and shapes of objects by means of said minimization of dissimilarity between the captured image and the virtual image. Application of said algorithms results in virtual 3D objects with reconstructed structure and a virtual 3D scene with arranged objects and adjusted shape, respectively. Eventually, this results in a final virtual scene with accurate textures, shapes and arrangement of virtual 3D objects within said scene.

Digital twin of the physical camera is based on wave optics and involves at least a camera optical system model, a sensor model, and (optionally) a lens filter model which are combined to simulate the physical camera, by means of which the captured image is captured. The digital twin of the camera also emulates the image processing algorithm which is identical or similar to that of the physical camera, and produces the virtual (rendered) image such that:

$$\|I_c - I_r\| \approx 0$$

It should be noted that the captured image, i.e. the one that is captured by the physical camera, is not ideal because of diffraction, residual aberrations of the physical optical system, as well as due to noise and nonlinearity caused by the physical image sensor. Virtual (rendered) image generated by the digital twin of the physical camera is almost identical to the captured image because the digital twin of the physical camera takes into account the diffraction and aberrations introduced by the optical system, influence of the image sensor, and the image processing algorithm which is substantially the same as that of the physical camera. The digital twin of the physical camera used in the disclosure is advantageous over the rendering techniques used in the prior art, such as e.g. ray tracing that relies on a model of an optical system, and does not take into account diffraction, influence of image sensor and image processing algorithm in the rendering process. In other words, in conventional rendering techniques such as e.g. ray tracing, $$\|I_c - I_r\| >> 0$$

It should be noted that, in general, a physical camera captures a real world 3D scene through a spectral filter. In the disclosure, simulation of light wave propagation from a virtual 3D scene through a filter and a virtual camera lens is fulfilled by means of a rendering software which relies on wave optics. The disclosure takes into account the influence of camera sensor and image processing algorithm which are used in the physical camera. As a result, the captured image and the virtual (rendered) image are almost similar, by virtue of the fact that physical-based rendering (i.e. realistic rendering which accounts for physical parameters of the optical system) software which renders a virtual image is based on wave optics, taking into account the model of image sensor of the physical camera, as well as its image processing algorithm.

Wave optics makes it possible to take into account diffraction effects, whereas conventional rendering software based on ray tracing does not have such capabilities. Besides, as aforementioned, physical based rendering software employs a model of the image sensor and the image processing algorithm of the physical camera, whereas, again, conventional approaches only rely on ray tracing. The spectral filter used in the physical camera enables controlling the color range, whereas the Bayer filter used in conventional image sensors restricts the color range.

FIG. 1 schematically illustrates a technique for generating a virtual scene comprising one or more 3D objects according to an embodiment of the disclosure.

Referring to FIG. 1, a non-limiting technique for generating a virtual scene comprising one or more 3D objects is described. Real world 3D scene 100 is captured by physical camera 200 which comprises at least one filter 210, resulting in a captured image $I_c$. On the other hand, a (initial) 3D scene $I_0$ is created by known 3D scene creation means (e.g., 3D scanner etc.).

Digital camera model builds image $I_l$ of at least one initial virtual image $I_0$ object. Mathematically, the image generation process can be represented as function of parameters p, r, d, n that maps $I_0$ to image $I_l$:

$$I_l = f\{I_0\}(p,r,d,n),$$

where r, d, n are parameters of digital camera model 300 (r are surface shape parameters, e.g. radii, nonsphericity factors, d are parameters of positional relationships of surfaces. e.g. distances between components, decentering, inclinations, n are parameters of materials, e.g. refraction index, Abbe number), p are parameters of filter 310 in the digital camera model (e.g. transmittance factor, phase delay).

Then, using wave optics based light propagation algorithm, function $f\{I_0\}$ is calculated. Function $f\{I_0\}$ is an optical system operator which maps input signal in the form of intensity distribution in an object $I_0$ to an output signal in the form of intensity distribution in image $I_l$. In this case, the algorithm is, by way of a non-limiting example, as follows:
1. Transmission and aberrations are determined from the ray propagation calculation depending on coordinates in the pupil;
2. A pupil function is generated, which includes the transmission and the aberrations;
3. A scatter function is calculated as a squared Fourier transform of the scatter function;
4. Intensity distribution in the image is determined in the form of a convolution of intensity distribution on an object with the scatter function.

Image sensor 320 of the digital camera model transforms $I_l$ into image $I_s$:

$I_s=f\{I_I\}(s,k_\lambda,\mu)$, where $s,k_\lambda,\mu$ are parameters of the image sensor 320, namely s is sampling and integration operator which describes the process of digitization of analog image $I_I$ generated by the optical system and includes sampling at a pixel spacing frequency of the receiver, pixelwise integration, which is signal accumulation (in the form of a charge or voltage) and its quantization for each color channel; $k_\lambda$ is spectral sensitivity of the receiver; and $\mu$ is receiver noise.

Image processing algorithm 330 of the digital camera model transforms image $I_s$ into the virtual (rendered) image $I_r$:

$I_r=f\{I_s\}(w_1, w_2 \ldots w_i)$, where $w_1, w_2 \ldots w_i$ are parameters of the image processing algorithm 330 of the digital camera model, for example parameters of the applied digital filters or weights of neural network layers.

Simulation of light wave propagation from the initial virtual 3D scene $I_0$ through filter 310 and image sensor 320 of the digital camera model 300 is fulfilled by physical-based rendering software using wave optics, which takes into account influence of the image sensor 320 and image processing algorithm 330 which correspond to those used in the physical camera 200.

Then the dissimilarity norm between the captured image $I_c$ captured by the physical camera and the virtual (rendered) image $I_r$ generated by the physical-based rendering software through the digital camera model is minimized such that:

$$\|I_c - I_r\| \approx 0.$$

As a result, the captured image and the virtual image are almost similar by virtue of using physical based rendering based on wave optics, taking into account image conversion by the image sensor and processing algorithm.

The wave propagation principle used in the physical-based rendering software according to the disclosure is based on Huygens-Fresnel principle, where field u(p) in point p(x,y,z) can be expressed by Rayleigh-Sommerfeld diffraction formula (see Michael Bass "Handbook of optics", volume I, Second Edition, New York: McGraw-Hill, 1995):

$$u(p) = \int\int_A u(p_0)\left[\frac{iz}{2\pi\rho}(1-ik\rho)\frac{\exp(ik\rho)}{\rho^2}\right]dx_0 dy_0$$

$$\rho = \sqrt{(x-x_0)^2 + (y-y_0)^2 + z^2}$$

where $u(p_0)$ are field values in the aperture A, at z=0;
$\rho$ is the distance between a point in the aperture $p_0$ and the point of observation p.

For approximate calculations, the following formulas can be used:

Fraunhover approximation (when $z \gg k(x_0^2+y_0^2)/2$):

$$u(\mu) = -\frac{i}{\lambda r}\exp(ikr)\int\int_A u(p_0)\exp\left[-\frac{ik(xx_0-yy_0)}{r}\right]dx_0 dy_0$$

$$r = \sqrt{x^2+y^2+z^2}$$

Fresnel approximation (when $z^3 \gg \pi/4\lambda[(x-x_0)^2+(y-y_0)^2]^2$):

$$u(p) = -\frac{i}{\lambda z}\exp(ikz)\int\int_A u(p_0)\exp\left[-\frac{ik((x-x_0)^2-(y-y_0)^2)}{2z}\right]dx_0 dy_0$$

In an embodiment of the disclosure, algorithm of surface properties reconstruction in accordance with the inventive technique works as follows. 3D model creation step takes, as input, 3D objects with approximate surface properties. In general, surface properties may be described by parameters of applied color model (RGB, CMY etc.), parameters of surface texture, or Bidirectional reflectance (transmittance) distribution function (BRDF, BTDF). A 3D scanner only provides approximate surface properties using embedded color camera. Captured colors are inaccurate because of the restricted spectral range of the Bayer filter.

In the disclosure, a set of spectral filters is used to increase the color range. Furthermore, a physical-based model of filter is used in the rendering software, which also increases the accuracy of surface properties reconstruction. Besides, a model of the Bayer filter may also be applied in the inventive technique.

The inventive algorithm takes into account the aberrations and diffraction of the physical camera optical system and minimizes their impact on the created 3D model. It should be noted that chromatic aberrations are especially critical for reconstruction of surface properties.

Minimization of dissimilarity norm between the captured image and the virtual image is performed such that:

$$\|I_c - I_r\| \xrightarrow{min} 0$$

This also refers, in particular, to chromatic aberrations, influence of which is minimized by using the inventive algorithm of surface properties reconstruction. In contrast, since conventional rendering software does not use a "digital twin" of the camera, conventional rendering does not take into account the imperfections of a physical camera, which manifest themselves in aberrations, diffraction, noise, and also does not account for restriction of the color range due to the use of the Bayer filter. Thus, the algorithm of surface properties reconstruction in accordance with the disclosure provides for photorealistic surface properties, makes the reconstructed 3D object surface model independent on the particular physical camera, and minimizes the influence of aberrations and diffraction on the rendered surface properties.

Algorithm of virtual objects positioning and shape adjustment in accordance with the inventive technique works as follows. 3D model creation step takes, as input, virtual 3D objects with inaccurate arrangement and shapes. On the other hand, physical camera generates images with residual aberrations, which distort shape and position. The algorithm of virtual objects positioning and shape adjustment takes into account the aberrations and diffraction and minimizes their impact on the virtual model.

Image distortion is especially critical for positioning and shape adjustment. A 3D scanner does not provide precise positions of objects which are present within a real world 3D scene. Therefore, the digitized objects should be positioned within virtual 3D scene. Arrangement is fulfilled by performing the step of minimizing dissimilarity between the captured image and the virtual image. For this purpose, rendering software uses the digital twin of the physical camera. In this way the accuracy of rendering is increased.

Use of the digital twin of the physical camera in accordance with the disclosure, as well as the algorithm of virtual objects positioning and shape adjustment in accordance with the inventive technique makes the rendered virtual 3D scene independent on the physical camera. Besides, it allows accurate pixel matching of objects between the virtual image and the captured image, and adjusting the shape and position of digitized objects in a precise manner. Besides, using this technique, one captured image generated by the physical camera is substantially enough for implementing the inventive method, and it is not necessary to generate a plurality of captured images from different viewpoints, aspects etc. However, it should be noted that a larger number of captured images may further increase the accuracy of positioning and shape adjustment up to sub-pixel values.

Thus, as compared to prior art techniques employing an ordinary 3D scanner, where real world 3D objects shape is captured inaccurately, while surface properties are only acquired by embedded general purpose color camera where colors are restricted by Bayer filter and RGB space, no filters are used while capturing image(s) of a real world 3D scene, 3D objects existing in the rendered 3D scene are only roughly aligned and should be positioned manually by a human operator, in the disclosure 3D object surface properties are accurately captured, and their shape and positioning within the 3D scene is adjusted and verified, a combination of a physical camera and a digital camera model (digital twin of the camera) is used. The inventive technique also uses a filter or a set of filters in the physical camera to generate the captured image, and also takes into account the parameters of said filter (or said set of filters) in the digital camera model. As a result, any wavelength can be captured and simulated due to the use of the filter and taking into account said filter in the digital camera model, which allows accurately capturing and rendering texture characteristics, as well as shape adjustment and verification. The disclosure allows for pixel-by-pixel alignment of the shapes and positions of the 3D objects in the rendered 3D scene, and automatic positioning of the 3D objects in the rendered virtual 3D image.

Having described above the general principles of the inventive technique and its operation, we now proceed to the detailed description of the embodiments of key elements of the inventive technique.

Figure 2:
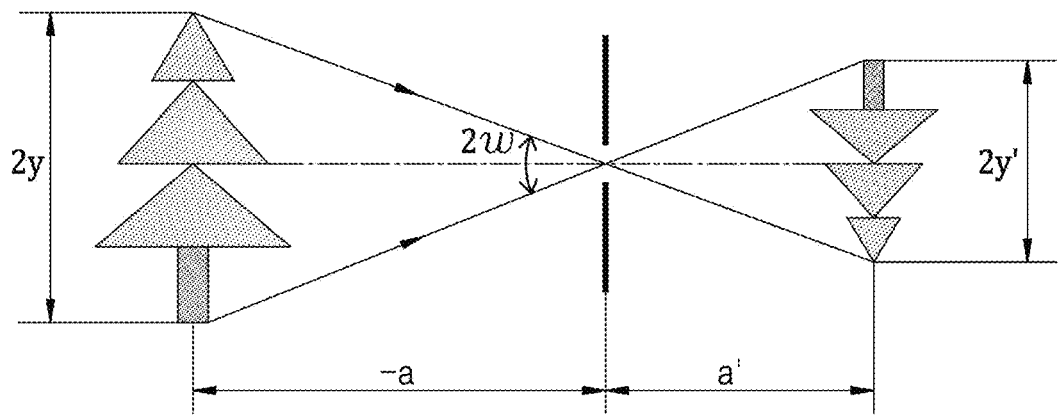
FIG. 2 schematically illustrates an embodiment in which the digital camera model is based on a pinhole camera model according to an embodiment of the disclosure.

FIG. 2 schematically illustrates an embodiment in which the digital camera model is based on a pinhole camera model according to an embodiment of the disclosure.

According to an embodiment of the disclosure, the digital camera model (also referred to as the digital twin of the physical camera) may be generated in the form of a pinhole camera for each channel of light (e.g. each color channel in the RGB space) reflected from the real world 3D scene. Principle of operation of the digital camera model in this non-limiting embodiment is as follows. In a pinhole camera, light from a scene passes through the aperture and projects an inverted image onto an analysis plane. Referring to the schematic illustration in FIG. 2, in the digital camera model according to the disclosure, pinhole is modeled using following parameters:

2ω is field of view (FoV) or angle, through which the real world scene is registered in the analysis plane;
y is object height in the real world scene;
y' is image height in the analysis plane;
a is distance from the real world object to the pinhole;
a' is distance from the pinhole to the analysis plane;
β is magnification.

$$\beta = -\frac{y'}{y} = \frac{a'}{a}$$

This embodiment is most simply implemented, in particular since it allows generating an ideally sharp all-in-focus image, fast 3D object texture capturing and 3D objects arrangement.

Figure 3:
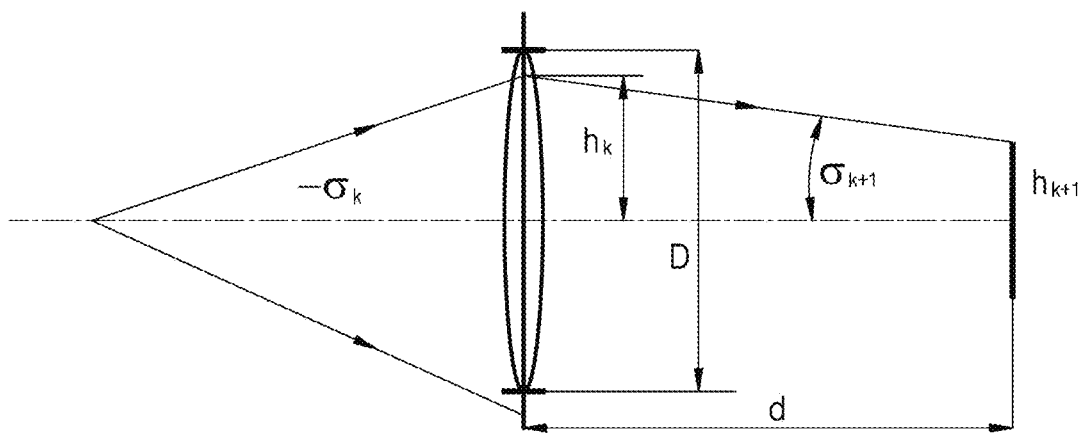
FIG. 3 schematically illustrates an embodiment in which the digital camera model is based on an ideal lens model according to an embodiment of the disclosure.

FIG. 3 schematically illustrates an embodiment in which the digital camera model is based on an ideal lens model according to an embodiment of the disclosure.

In an embodiment, the digital camera model (digital twin of the camera) may be based on an ideal lens. Ideal lens, which is schematically illustrated in FIG. 3, is generally characterized by the following parameters:

focal length $f'$ or optical power $\Phi=1/f'$.
size of aperture D.

The ideal lens model in the context of the disclosure works as follows. Any incident light beam that falls within the aperture defined by the diameter of the ideal lens is traced in accordance with the following formulas:

$$\tan \sigma_{k+1} = \tan \sigma_k h_k \Phi$$

$$h_{k+1} = h_k - d \tan \sigma_{k+1}$$

where $\sigma_k$ is an angle between the optical axis and a ray that is incident on the ideal lens, $h_k$ is the height of the ray in the lens; $\sigma_{k+1}$ is the angle between the optical axis and the ray that has passed through the lens; $h_{k+1}$ is the height of the ray in the analysis plane; d is distance between the lens and the analysis plane.

Any light beam that misses the aperture of the ideal lens is blocked. This embodiment of the digital camera model (digital twin of the camera may be especially advantageous in that it takes into account the depth of field, as well as lens diameter (to estimate illumination), unlike the embodiment where the digital camera model is based on pinhole camera as described above.

Figure 4:
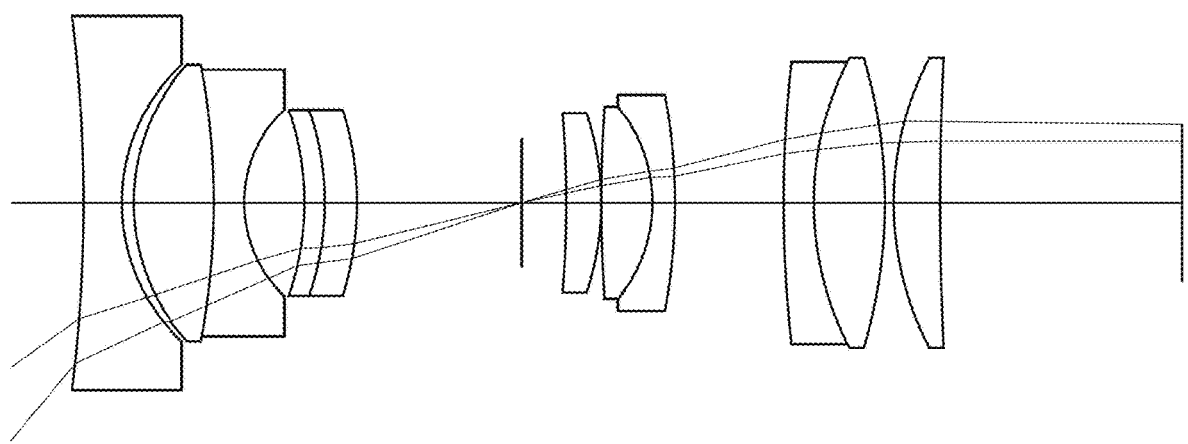
FIG. 4 schematically illustrates an embodiment where the digital camera model uses a modeled optical system with distortion according to an embodiment of the disclosure.

FIG. 4 schematically illustrates an embodiment where the digital camera model uses a modeled optical system with distortion according to an embodiment of the disclosure.

In an embodiment, the digital camera model (digital twin of the camera) may be based on a model of optical system which is free from aberrations except distortion. In this case image blur which is inherent for the optical system of a physical camera is not taken into account, and thus the digital twin of the camera substantially only recreates the image distortion which is also inherent for the optical system of the physical camera, for which the digital twin of the camera is created. This is achieved by using a modeled optical system with distortion as schematically illustrated in FIG. 4, where pinhole aperture is used. This advantageously allows using the digital camera model to adjust 3D objects shape in images without blur but with the same distortion as in the respective physical camera.

Figure 5:
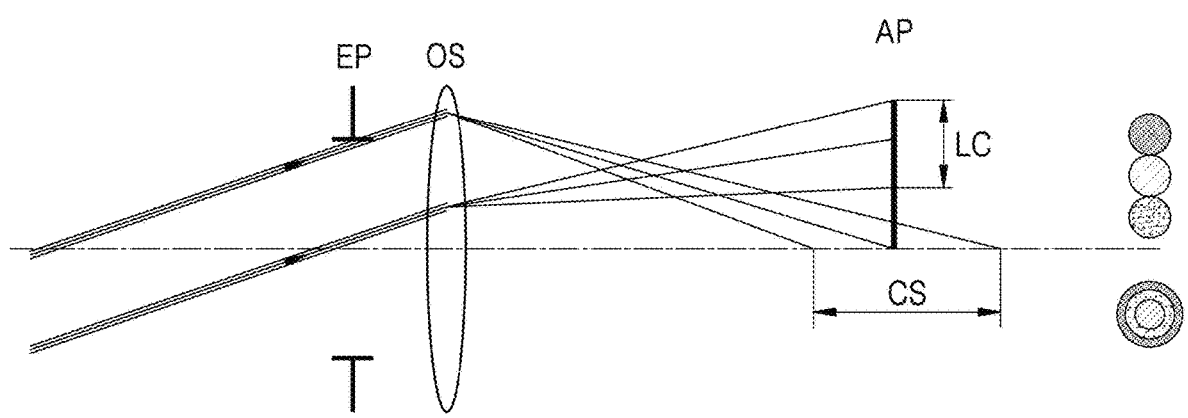
FIG. 5 schematically illustrates an embodiment where the digital camera model uses a model of an optical system with chromatic aberrations according to an embodiment of the disclosure.

FIG. 5 schematically illustrates an embodiment where the digital camera model uses a model of an optical system with chromatic aberrations according to an embodiment of the disclosure.

In an embodiment, the digital camera model (digital twin of the camera) may be based on a model of an optical system with chromatic aberrations as schematically illustrated in FIG. 5, where EP stands for entrance pupil, AP stands for analysis plane, CS stands for chromatic shift, LC stands for lateral color. Chromatic aberrations are stipulated by a dependency of the refraction index of optical materials of optical system components and diffraction angles on wavelength. To calculate these aberrations in ray tracing, it is sufficient to take these dependencies into account. Here, certain incident light beams which enter the model of the optical system through the entrance pupil pass through the optical system while generating a so-called chromatic shift, as well as so-called lateral colors in the analysis plane of the digital camera model, which results in a rendered virtual image with the same chromatic aberrations as in the image captured by the physical camera. Taking into account chromatic aberrations improves the accuracy of surface properties restoration (texture, reflectance and color properties).

In an embodiment, the digital camera model (digital twin of the camera) may employ a set of polarization filters in the role of a so-called polarization-dependent component which is configured to attenuate or block light beams with certain polarization (e.g. s-polarized or p-polarized) and thus remove unwanted effects such as e.g. glares in the virtual image, like a polarization filter mounted in a physical camera eliminates unwanted effects such as glares in the captured image. This may advantageously allow capturing 3D object surface properties with high accuracy, take into account glares on 3D object surfaces, and distinguish between glares and textures, so as not to reproduce the unwanted glares in the generated virtual 3D scene.

In an embodiment, the digital camera model (digital twin of the camera) may employ a so-called image sensor with on-chip lens (OCL), where, by way of a non-limiting example, two, four or more identical adjacent pixels have a common lens. In general, image sensors with OCL are used in phase-detection autofocus. The principle of OCL operation is as follows: if an image is out of focus, image sensor detects two sub-images offset from each other (for dual-pixel OCL) or four offset sub-images (for quad-pixel OCL) of the same object in the real world scene to be imaged. Then, autofocus is fulfilled by minimization of said offsets. In the context of the disclosure, such digital camera model (digital twin of the camera) may be especially advantageous, in particular, in that it may be employed with an advanced image sensor in the digital camera model, which results in an increased accuracy of 3D objects positions due to a parallax in sub-images generated by the modeled image sensor with OCL.

Figure 6:
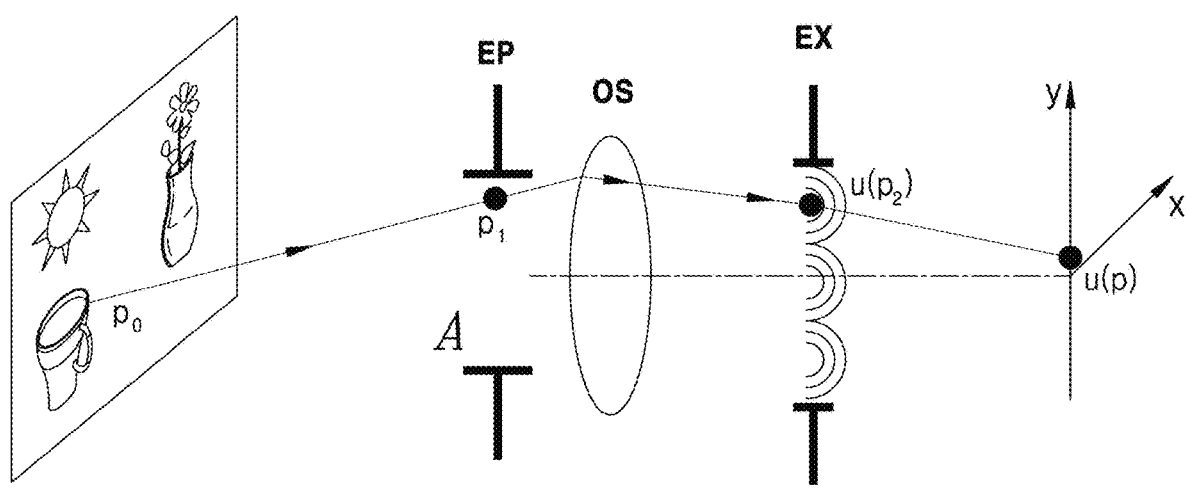
FIG. 6 schematically illustrates an algorithm of operation implemented by the physical-based rendering software according to an embodiment of the disclosure.

FIG. 6 schematically illustrates an algorithm of operation implemented by the physical-based rendering software according to an embodiment of the disclosure.

In an embodiment, the physical-based rendering software which implements the digital camera model (digital twin of the camera) may employ hybrid simulation, which involves, in particular, a combination of ray tracing and wave propagation simulation. In such case, the algorithm of operation implemented by the physical-based rendering software is a two-stage algorithm, where, at the first stage, light beams (rays) are traced to the exit pupil of the optical system in the digital camera model, which is schematically illustrated in FIG. 6, where EP stands for entrance pupil, OS stands for optical system, EX stands for exit pupil.

The first stage results in a pupil function which describes how a light wave is affected upon transmission through the simulated optical system. The pupil function is characterized by the following expression:

$$f(p_1) = \begin{cases} \sqrt{\tau(p_1)} \exp(-2\pi i W(p_0)) \text{ in pupil } A \\ 0 \text{ out of pupil } A \end{cases},$$

where $p_0$ are coordinates in the entrance pupil, $\tau$ is transmission along path $p_1 p_2$, W is wave aberration, i is an imaginary number.

Field in the exit pupil is proportional to the pupil function:

$$u(p_2) = f(p_1)$$

At the second stage wave propagation from the exit pupil to the image plane is used. For fast estimation, a diffraction formula may be approximated by Fourier transform:

$$u(p) = F[u(p_2)] = F[f(p_1)],$$

where F is Fourier transform operator.

If $p_0$ is a point source, square of $u(p)$ is a point spread function (PSF):

$$PSF(p) = PSF(x,y) = |F[f(p_1)]|^2$$

The PSF describes the response of the optical system to a point object. Image $I_f$ formed by the optical system on a part of the image sensor being simulated by the digital camera model (corresponding to field where PSF can be considered to be invariant) may be represented as a convolution of object intensity distribution $I_{0\lambda}$ and PSF: $I_f = I_{0\lambda} * PSF_\lambda(x,y)$ where $\lambda$ in subscript means wavelength dependence. Considering wavelength sensitivity of sensor $k_\lambda$, formed image is characterized by:

$$I_f = \int I_{0\lambda} * PSF_\lambda(x,y) k_\lambda d\lambda.$$

Image $I_f$ formed on the image sensor is digitized (integrated over the sensor pixels, sampled at a pixel spacing frequency and quantized by levels), and becomes noisy $\eta$, yielding resulting image:

$$I_s = S(I_f) + \eta,$$

where S is a digitization operator.

Then the image processing algorithm of the digital camera model converts the image $I_s$ into a virtual (rendered) image $I_r$:

$$I_r = f\{I_s\}(w_1, w_2 \ldots w_i),$$

where $w_1, w_2 \ldots w_i$ are parameters of image processing algorithm 330 in the digital camera model, e.g. parameters of the digital filters being used, or weights of neural network layers.

This embodiment of the digital camera model (digital twin of the camera) is especially advantageous in terms of the best accuracy of surface properties restoration, digitized objects positioning, and high computational performance stipulated by the model which works as described above.

The step of rendering a virtual 3D scene in accordance with the disclosure may also be implemented in various ways. In general, the virtual 3D scene is created by means of analyzing the shape and position of real world objects existing within the real world 3D scene by means of a 3D scanner, or reconstructing them using depth cameras, as mentioned above. Besides, a bidirectional scattering distribution function (BSDF) is evaluated for the objects in the real world 3D scene, the BSDF being a superset and the generalization of the bidirectional reflectance distribution function (BRDF) and bidirectional transmittance distribution function (BTDF), which characterize reflected light scatter angular distribution and transmitted light scatter angular distribution, respectively. Data from the 3D scanner, as well as the BSDF values are used for rendering the virtual 3D scene. The rendered virtual 3D scene may, in its capacity as such, be used for various purposes, such as acting as a dataset for verification of rendering software, a test target for camera testing, a dataset for generation of image pairs (captured and rendered ones) for machine learning (ML) purposes. Software verification is carried out by comparing a virtual image generated by the software being tested and an image captured by a certified physical camera. And, vice versa, certified software may be used for camera testing e.g. in a production line. Based on the level of matching of said images, one may judge on the quality of software or camera, respectively. Level of matching is evaluated according to formula $\|I_c-I_r\|$. Certified camera or certified software means such camera or software, for which condition $\|I_c-I_r\|\approx 0$ on a certain selected test scene is met.

Most importantly, test scene is used in the disclosure to provide a virtual (rendered) image $I_r$ which is then involved in the step of minimizing dissimilarity norm between the captured image and the virtual image.

Optionally, a real world 3D scene to be rendered to create the virtual image may be disposed in a test room where a light-absorbing interior is provided, or which is configured to isolate the real world 3D scene from external influences by means of light-proof walls, ceiling and floor, soundproofing or vibration isolation materials. A test room may also be an environmental (climatic) chamber to simulate environmental conditions, such as temperature, pressure, humidity. Besides, the test room may have tunable parameters, such as parameters of light sources, temperature, humidity, pressure etc. This may further increase the accuracy of 3D object positioning and texture capturing, predictability of simulation by virtue of a managed environment, simplify the optimization (minimization of dissimilarity norm) step by removing environment influence from the optimization process.

In the test room, a kinematic mount for the physical camera, a tripod, a rack, a camera-stabilizing stand may be employed so as to enable image capturing from a selected free viewpoint within the test room. Dampers, shock absorbers etc. may also be used to protect the camera from vibrations. This allows virtual 3D scene capturing from any desired angle, protection from vibrations, as well as image stabilization.

For the arrangement of objects in the virtual scene to be the same as the one of the objects in the virtual scene, which would minimize $\|I_c-I_r\|$, positions of virtual objects in the rendered virtual 3D scene may be adjusted. However, in an embodiment, as an alternative, positions of real world 3D objects may be adjusted in the test room environment in the process of 3D scene rendering, which is somewhat more complicated, since it requires using various mechanical means, but this may also be implemented in certain non-limiting embodiments of the disclosure and may also minimize $\|I_c-I_r\|$.

Use of the physical camera and a digital camera model, as well as use of a physical-based rendering software for rendering the virtual 3D scene as described above allow for fast automated positioning of virtual objects, realistic rendered virtual 3D image, accurate pixel matching of objects between a real world 3D scene and rendered virtual 3D scene, precise shape and position of digitized real world 3D objects. Besides, in accordance with the inventive technique, one captured image is substantially enough to perform the method, i.e. it is not necessary to capture multiple images of real world 3D objects in the real world scene from various viewpoints etc. This is achieved by virtue of the fact that the conversion process is known (PSF calculation, convolution, digitization), as are all converting elements (optical system, image sensor, processing algorithm) of the digital twin for conversion of intensity distribution of 3D objects in the scene $I_l$ into an intensity distribution of virtual image $I_r$. I.e. a mutually unambiguous connection between $I_l$ and $I_r$ is established. The rendered virtual 3D model does not depend on the physical camera, since all specificities of the physical camera are accounted for in the digital twin of the camera (digital camera model). It should be noted that a larger number of the captured images may improve the accuracy of surface properties reconstruction and positioning of virtual objects in the 3D scene up to sub-pixel values.

Figure 7:
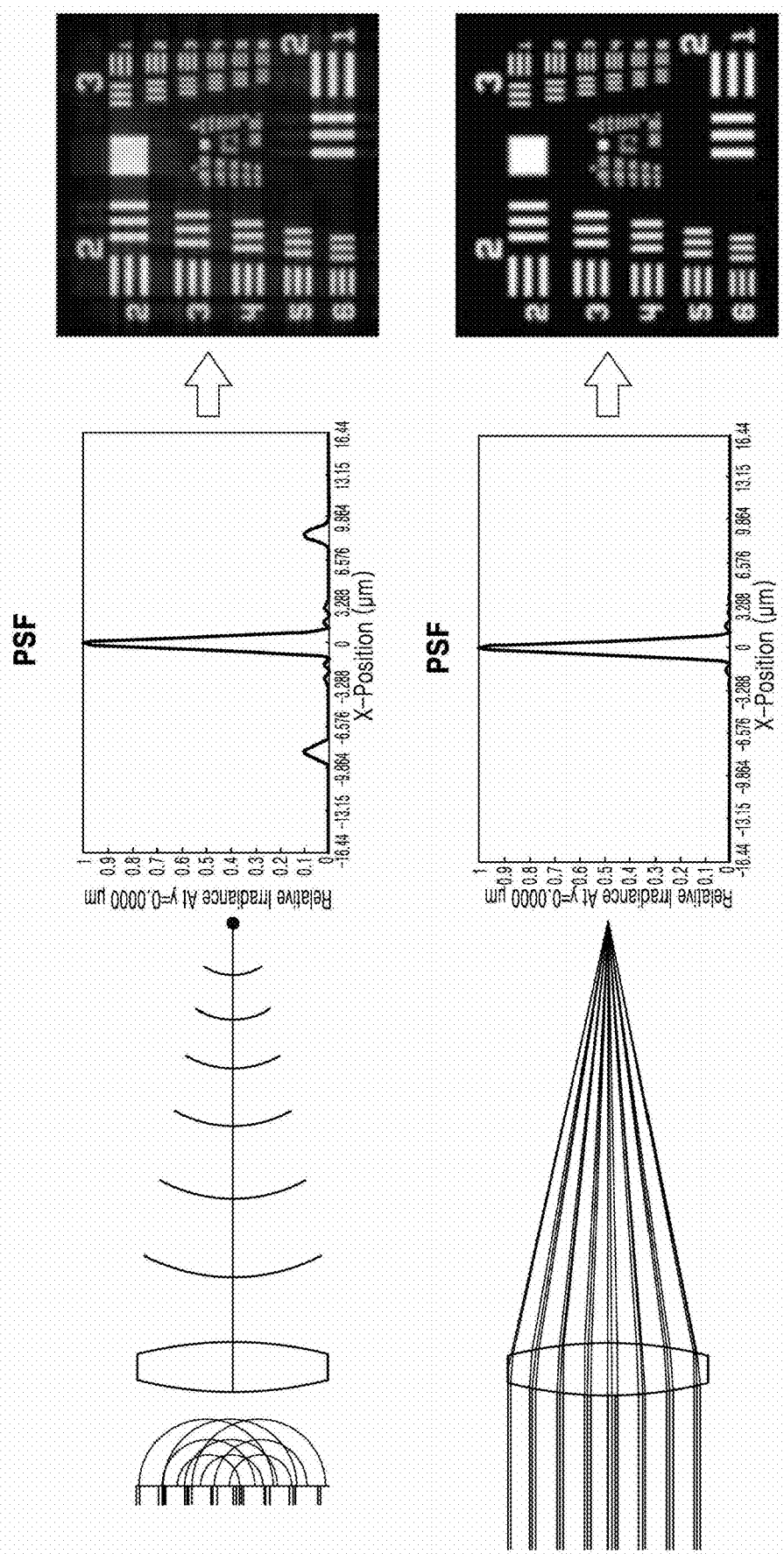
FIG. 7 schematically illustrates the difference between light propagation modeling and ray tracing according to an embodiment of the disclosure.

FIG. 7 schematically illustrates the difference between light propagation modeling and ray tracing according to an embodiment of the disclosure.

It should be noted that the inventive technique is distinguished by the fact that the physical-based rendering software used in the disclosure relies on wave optics for light wave propagation modeling, whereas conventional rendering software is typically based on ray tracing. The difference between the light propagation modeling and the ray tracing is illustrated in FIG. 7, where top scheme illustrates the wave propagation modeling technique and bottom scheme illustrates the prior art ray tracing technique. In both schemes, light is transmitted through a diffractive grating and a lens which stand for the modeled optical system. Diffractive grating is used e.g. when it is necessary to account for diffractive effects, which is required for realistic modeling of physical cameras covered by a smartphone display—under-display cameras (UDCs). Structural elements of a display (thin-film transistors on pixels, feed bars, transparent spaces between pixels) constitute a diffractive grating for the camera.

It is noted that the PSF diagram in the top scheme shows the presence of side lobes (peaks) alongside with the main peak, while ray tracing does not show the side lobes. The inventive wave propagation technique takes into account diffraction, unlike the prior art technique does not take into account the diffraction. As a result, an image rendered using the conventional ray tracing technique is only a rough approximation of the real world 3D scene, while the rendered image in accordance with the disclosure is more physically correct, since it takes into account the diffraction, thus increasing the accuracy of texture capturing and 3D objects positioning.

Physical-based rendering software in accordance with the disclosure makes use of a model of image sensor and image processing algorithm of the physical camera, while conventional approaches typically again only rely on ray tracing modeling in this regard.

Another important feature of the disclosure is the use of a spectral filter, which expands the color range in the digital camera model, unlike the prior art, where Bayer filter is used with the image sensor, which restricts the color range rather than expands it. In a physical camera, spectral filter may be implemented e.g. on the basis of tinted optical glass which is characterized by different absorbance of various spectral bands, or on the basis of interference coatings which only transmit a certain portion of the spectrum.

Figure 8:
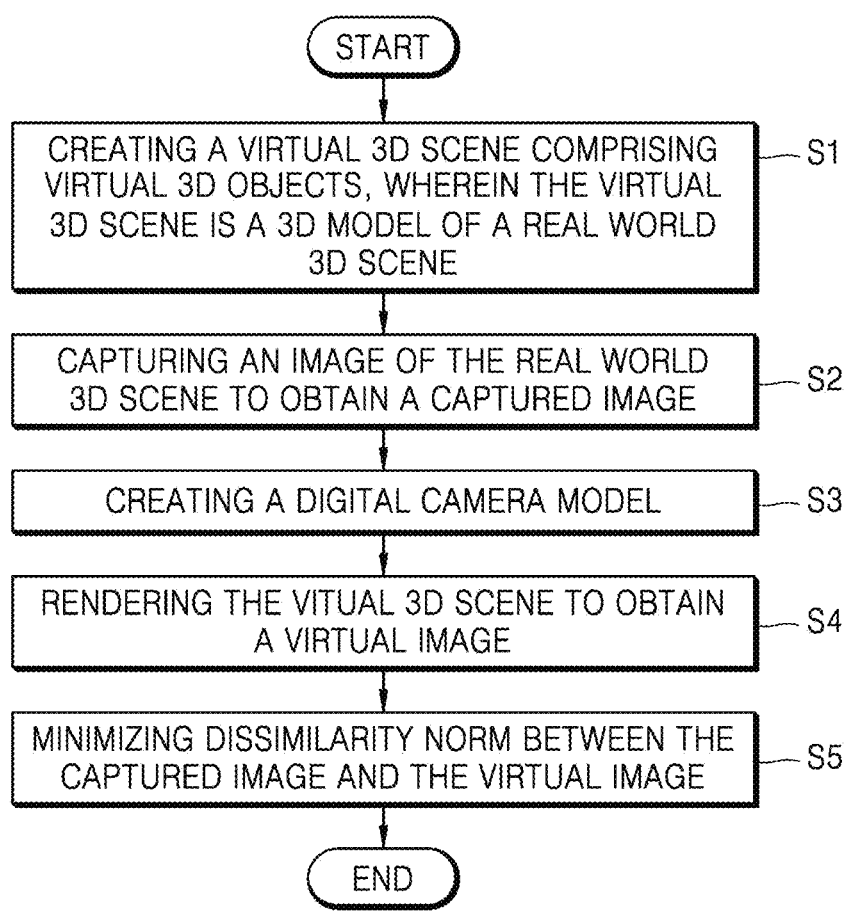
FIG. 8 is a flowchart of the inventive method for generating a virtual scene comprising one or more 3D objects according to an embodiment of the disclosure.

FIG. 8 is a flowchart of the inventive method for generating a virtual scene comprising one or more 3D objects according to an embodiment of the disclosure.

Taken in general, the method according to the disclosure works as follows. The method for generating a virtual scene comprising one or more 3D objects in the disclosure comprises the following steps, as illustrated in FIG. 8.

At operation S1, a virtual 3D scene comprising virtual 3D objects are created, wherein the virtual 3D scene is a 3D model of a real world 3D scene. For this purpose, various techniques that are well known in the art may be used. The disclosure is not restricted to any particular techniques that may implement this step. By way of an illustrative example, a 3D scanner may be used, or light-field camera, or depth camera, or a 3D printer with software for 3D modeling may be used. It should be noted that this initial 3D model of the real world scene is characterized by incorrect (or imprecise)

arrangement of objects and inaccurate surface texture as compared to the real world 3D scene, on which said initial 3D model is based.

At operation S2, an image of the real world 3D scene is captured using a physical camera to obtain a captured image. The physical camera may be any real world camera with known parameters (structural parameters of the optical system, parameters of the image sensor, parameters of the algorithm), such as a photo camera, a video camera, a depth of field camera, a 3D camera etc. The disclosure is not restricted to any particular physical camera. As an illustrative example, one may mention a camera of a mobile phone or a smartphone (Samsung S22), digital photo camera (Sony, Canon, Nikon), 3D camera (Lytro).

The disclosure is not restricted to any specific type of a physical camera insofar as it is capable of obtaining a captured image in accordance with the disclosure.

At operation S3, a digital camera model of the physical camera is created, e.g. by using physical-based rendering software. Various implementations of this step are described above.

At operation S4, a virtual 3D scene is rendered using physical-based rendering software to obtain a virtual image, wherein the rendering is based on the digital camera model. In other words, the virtual image is rendered using the physical-based rendering software through the digital camera model (digital twin of the camera) and a model of filters. The digital twin of the camera increases the accuracy of rendering, while the set of filters provides for high quality texture capturing.

At operation S5, dissimilarity norm between the captured image and the virtual image is minimized to optimize the positions and surface parameters of the virtual 3D objects, $\min\|I_c - I_r\|$.

In an aspect, the inventive technique may be implemented by a system for generating a virtual scene comprising one or more 3D objects. The inventive system comprises a physical camera configured to capture an image of a real world 3D scene to obtain a captured image. The system also comprises a 3D scene digitizer configured to create a 3D model of the real world 3D scene, and a renderer configured to provide a digital camera model of the physical camera, and to render a virtual 3D scene comprising virtual 3D objects on the basis of the digital camera model to obtain a virtual image. The system further comprises an optimizer configured to minimize dissimilarity norm between the captured image and the virtual image to optimize the positions and surface parameters of the virtual 3D objects in the virtual 3D scene.

The 3D scene digitizer may comprise a 3D scanner, a light-field (plenoptic) camera, or a 3D printer with software for 3D modeling, as already discussed above in the detailed description of the inventive technique.

It is noted that, among the system components mentioned above, the physical camera is one specifically hardware component, not to mention that it is also controlled by its own software/firmware. All other system components may be to a certain extent hardware or software implemented, depending on a specific implementation of the disclosure. For example, as mentioned above, the 3D scene digitizer may be a hardware implemented 3D scanner or other type of camera suitable for creating 3D images using principles described above. The renderer and/or the optimizer may consist of one or more processors, such as general purpose central processing units (CPUs) and/or dedicated processors, such as graphics processing units (GPUs), digital signal processors (DSPs), or integrated circuits, application-specific integrated circuits (ASICs), field programmable gate arrays (FPGAs), hardware logics and the like, which perform their respective functions under the control of a suitable software and/or firmware etc., or may be implemented via respective software on the basis of one or more general purpose or specialized (e.g. 3D graphics processing) computers, or the like. The disclosure is not restricted to any specific combination of hardware and software, many of which would be apparent for a person skilled in the art upon careful reading of the disclosure.

Among the technical effects and advantages achieved by the disclosure one may name, in particular, the following. The disclosure provides a precise method for verification of physical-based rendering software, where different classes of objects can be tested. Depth of field, bokeh, perspective distortion, light-field properties, color properties etc. may be tested on a digital camera model (digital twin of the camera) while implementing the disclosure. This provides a reliable technique for physical camera versus digital camera model testing, as well as test targets for camera testing, and datasets for verification of physical-based rendering software, generation of image pairs for machine learning purposes etc. The disclosure as described hereinabove is industrially applicable in a wide range of technical fields, such as, but not limited to, metaverse client terminals, augmented reality (AR) and virtual reality (VR) headsets and displays, head-mounted displays, smartphones, 3D scanners, input devices (Kinect) etc., and in various other fields where photorealistic rendering and/or high geometric and color accuracy of 3D objects in a rendered virtual 3D scene may be of high importance.

The inventive technique for generating a virtual scene comprising one or more 3D objects was described above. Persons skilled in the art shall understand that the disclosure may be implemented by various combinations of hardware and software means, and any such particular combinations do not restrict the scope of the disclosure. The inventive technique may be implemented by one or more computer(s), processor(s) (CPUs) such as general purpose processors or specialized processors such as digital signal processors (DSPs), or by one or more ASICs, FPGAs, logic elements etc. Alternatively, one or more of its elements or method steps may be implemented as software means such as e.g. a program or programs, computer program element(s) or module(s) which control one or more computer(s), CPUs etc. These software means may be embodied in one or more computer-readable media which are well known to ones skilled in the art, may be stored in one or more memories such as a read only memory (ROM), a random access memory (RAM), flash memory, electrically erasable programmable read only memory (EEPROM), etc., or provided e.g. from remote servers via one or more wired and/or wireless network connections, the Internet, Ethernet connection, local area networks (LANs), or other local or global computer networks, if necessary.

Persons skilled in the art shall understand that only some of the possible examples of techniques and material and technical means by which embodiments of the disclosure may be implemented are described above and shown in the figures. Detailed description of embodiments of the disclosure as provided above is not intended for limiting or defining the scope of legal protection of the disclosure.

Other embodiments which may be encompassed by the scope of the disclosure may be conceived by persons skilled in the art after careful reading of the above specification with reference to the accompanying drawings, and all such apparent modifications, changes and/or equivalent substitutions are considered to be included in the scope of the disclosure.

All prior art references cited and discussed herein are hereby incorporated in this disclosure by reference where applicable.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generating a virtual scene comprising one or more three-dimensional (3D) objects, the method comprising:
   generating a virtual 3D scene comprising virtual 3D objects, wherein the virtual 3D scene is a 3D model of a real world 3D scene;
   obtaining an image of the real world 3D scene by using a physical camera;
   obtaining a digital camera model that emulates image processing of the physical camera;
   obtaining a virtual image by rendering the virtual 3D scene based on the digital camera model using a physical-based rendering software; and
   minimizing dissimilarity norm between the obtained image and the virtual image to optimize positions and surface parameters of the virtual 3D objects in the virtual 3D scene,
   wherein the digital camera model is based on an optical system model which is free from aberrations except distortion.

2. The method of claim 1, wherein the minimizing of the dissimilarity norm between the obtained image and the virtual image comprises applying an algorithm of surface properties reconstruction to optimize the surface parameters of the virtual 3D objects.

3. The method of claim 1, wherein the minimizing of the dissimilarity norm between the obtained image and the virtual image comprises applying an algorithm of virtual objects positioning to optimize the positions and shapes of the virtual 3D objects.

4. The method of claim 1, wherein the physical-based rendering software uses parameters of the physical camera to obtain the digital camera model.

5. The method of claim 1, wherein the physical-based rendering software uses light wave propagation modeling in rendering the virtual 3D scene.

6. The method of claim 1, wherein the digital camera model comprises a set of filters.

7. The method of claim 6, wherein the set of filters comprises a spectral filter configured to expand a color range in the digital camera model.

8. The method of claim 1,
   wherein an "on-chip lens" (OCL) type image sensor is used in the digital camera model, and
   wherein two, four or more of identical adjacent pixels have a common lens.

9. The method of claim 1,
   wherein the generating of the virtual 3D scene comprising virtual 3D objects further comprises generating at least one virtual image object, and
   wherein the obtaining of the virtual image by rendering of the virtual 3D scene further comprises generating an image of the at least one virtual image object based on the digital camera model.

10. The method of claim 1, wherein the digital camera model is based on a pinhole camera model.

11. The method of claim 1, wherein the digital camera model is based on an ideal lens model.

12. The method of claim 1, wherein the digital camera model is based on an optical system model with chromatic aberrations.

13. The method of claim 1, wherein the digital camera model further comprises a polarization filter model.

14. A system for generating a virtual scene comprising one or more three-dimensional (3D) objects, the system comprising:
   a physical camera configured to obtain an image of a real world 3D scene;
   a 3D scene digitizer configured to generate a virtual 3D scene comprising virtual 3D objects, wherein the virtual 3D scene is a 3D model of the real world 3D scene;
   a renderer including at least one processor configured to:
      provide a digital camera model that emulates image processing of the physical camera, and
      obtain a virtual image by rendering the virtual 3D scene based on the digital camera model; and
   an optimizer including at least one processor configured to:
      minimize dissimilarity norm between the obtained image and the virtual image to optimize positions and surface parameters of the virtual 3D objects in the virtual 3D scene,
   wherein the digital camera model is based on an optical system model which is free from aberrations except distortion.

15. The system of claim 14, wherein the 3D scene digitizer comprises a 3D scanner, a light-field or depth camera, or a 3D printer with software for 3D modeling.

16. A non-transitory computer-readable medium having a computer program stored thereon, wherein the computer program instructs at least one processor to perform the following operations:
   generating a virtual 3D scene comprising virtual 3D objects, wherein the virtual 3D scene is a 3D model of a real world 3D scene;
   obtaining an image of the real world 3D scene;
   obtaining a digital camera model that emulates image processing of a physical camera;
   obtaining a virtual image by rendering the virtual 3D scene based on the digital camera model; and
   minimizing dissimilarity norm between the obtained image and the virtual image to optimize positions and surface parameters of the virtual 3D objects in the virtual 3D scene,
   wherein the digital camera model is based on an optical system model which is free from aberrations except distortion.

17. The non-transitory computer-readable medium of claim 16, wherein the minimizing of the dissimilarity norm between the obtained image and the virtual image comprises applying an algorithm of surface properties reconstruction to optimize the surface parameters of the virtual 3D objects.

18. The non-transitory computer-readable medium of claim 16, wherein the minimizing of the dissimilarity norm between the obtained image and the virtual image comprises applying an algorithm of virtual objects positioning to optimize the positions and shapes of the virtual 3D objects.

19. The non-transitory computer-readable medium of claim 16,
   wherein the generating of the virtual 3D scene comprising virtual 3D objects further comprises generating at least one virtual image object, and wherein the obtaining the virtual image by rendering of the virtual 3D scene further comprises generating an image of the at least one virtual image object based on the digital camera model.

* * * * *